United States Patent [19]

Cinquin et al.

[11] 4,451,866
[45] May 29, 1984

[54] METAL STRUCTURE GROUNDING SAFETY SYSTEM

[76] Inventors: Jean-Pierre Cinquin, Siccieu Saint-Julien, 38460 Cremieu; Jacques Danthony, 16ter Rue Greuze, 69100 Villeurbanne; Charles Mulertt, 105 Rue Tete d'Or, 69006 Lyon, all of France

[21] Appl. No.: 367,854

[22] Filed: Apr. 13, 1982

[30] Foreign Application Priority Data

Apr. 15, 1981 [FR] France ................... 81 07739

[51] Int. Cl.³ .................. H02H 9/04; H02H 9/06
[52] U.S. Cl. .......................... 361/56; 361/1; 361/104
[58] Field of Search ............ 361/56, 54, 55, 33, 361/23, 34, 104, 1; 337/15, 17, 18, 32; 307/100

[56] References Cited

U.S. PATENT DOCUMENTS 3,823,342  7/1974  Burr et al. .
3,914,656  10/1975  Hirschhorn et al. ........... 361/1
3,957,329  5/1976  McConnell ............... 361/16 X

FOREIGN PATENT DOCUMENTS 209191  6/1908  Fed. Rep. of Germany .
421798  11/1925  Fed. Rep. of Germany .
755291  10/1953  Fed. Rep. of Germany .
839744  1/1939  France .
1460049  10/1966  France .

Primary Examiner—Patrick R. Salce
Attorney, Agent, or Firm—Dowell & Dowell

[57] ABSTRACT

In order positively to ground a structure such as a pole carrying an electric line, which is not sufficiently grounded and therefore presents risks of electrocution in the event of untimely connection with the line, a voltage detector is provided, interposed between the structure and the ground, a fuse cartridge is connected to the voltage detector, said cartridge comprising a plunger which, when the cartridge is functioning, triggers a short-circuit switch grounding the structure via large-section conductors. A surge arrester is associated with the system which, during the very short instant necessary for the assembly constituted by the voltage detector and fuse cartridge and switch to function, maintains the voltage of the structure at a limited value not presenting any risk of instantaneous electrocution.

4 Claims, 5 Drawing Figures

METAL STRUCTURE GROUNDING SAFETY SYSTEM

The present invention relates to a safety system ensuring against rendering metal structures live.

Metal structures, such as for example poles supporting an electric line for railways, are known sometimes to be accidentally made live under the effect of an untimely contact or of leakage currents. There is then danger of electrocution. It has been proposed to avoid this danger by providing thermal or magnetic relays which, as soon as an abnormal potential is detected on the structure, positively connect the latter with a ground. However, such relays have a non-negligible response time, sufficient for a person touching the structure to be electrocuted. It has also been suggested to insert between the structure and the ground a surge arrester or a gas cell which limits the potential of the structure, but this remains dangerous.

In accordance with the invention, the above drawbacks are avoided by using, in combination:

a voltage detector device with semi-conductor having a conduction threshold of very low value, presenting no danger of electrocution;

a fuse cartridge with plunger, said cartridge being mounted in series with the detector device between the structure to be protected and the ground;

a short-circuiting switch also mounted between the structure and the ground, this switch, which is normally open, being closed by the plunger of the cartridge;

and a safety surge arrester likewise mounted between the structure and the ground, in parallel with the detector and the cartridge, this surge arrester starting at a voltage above the threshold of the detector, but low enough for there to be no danger of electrocution between the moment when the cartridge blows and cuts off the circuit which passes therethrough and the moment when the short-circuiting switch is closed.

It will be understood that, under these conditions, if a conductor under high voltage touches the structure, said structure is firstly connected to ground by the detector and the fuses of the cartridge. These fuses melt, but as soon as their melting begins, the plunger itself begins to actuate the switch, so that when the circuit is interrupted in the cartridge, this switch has already started its movement. The intermediate time between the opening of the circuit through the cartridge and the complete closure of the switch it therefore much shorter than with the arrangements of the prior art.

The invention will be more readily understood on reading the following description with reference to the accompanying drawings, in which.

Figure 1:
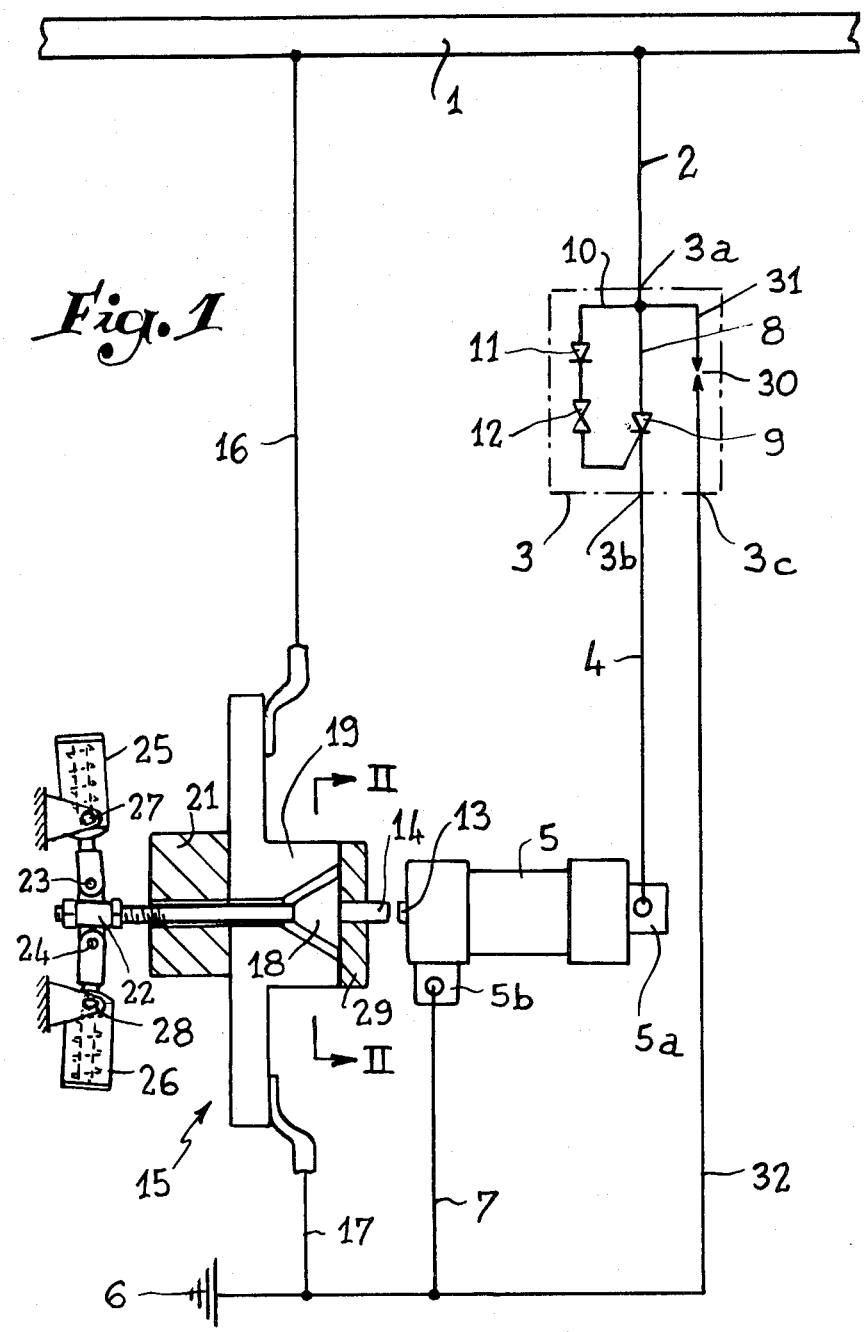
FIG. 1 is a schematic view showing an embodiment of the invention, the parts being shown in normal rest position.
Figure 3:
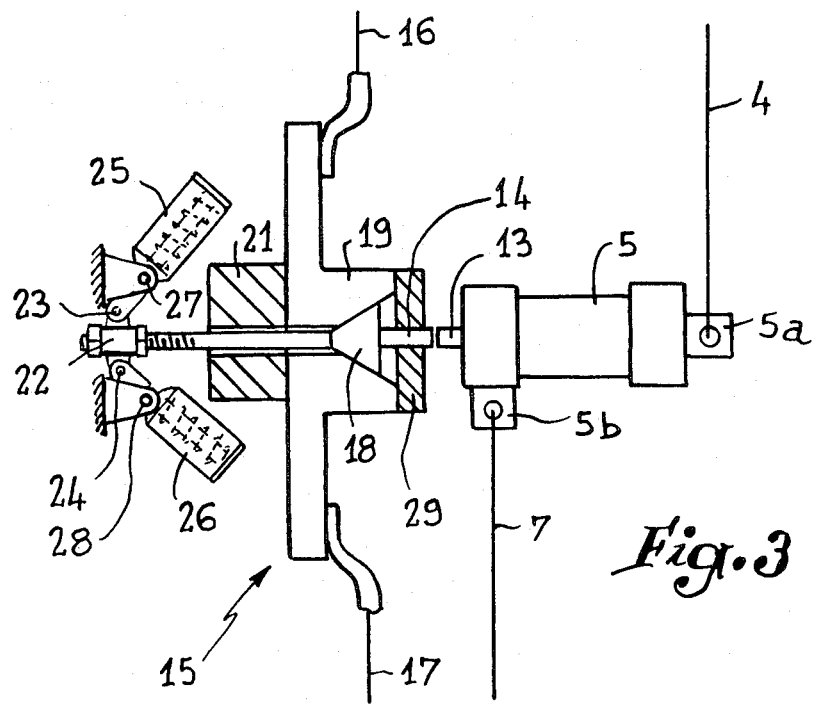

FIG. 3 partly reproduces FIG. 1, but showing the parts after closure of the short-circuiter for grounding.

Figure 4:
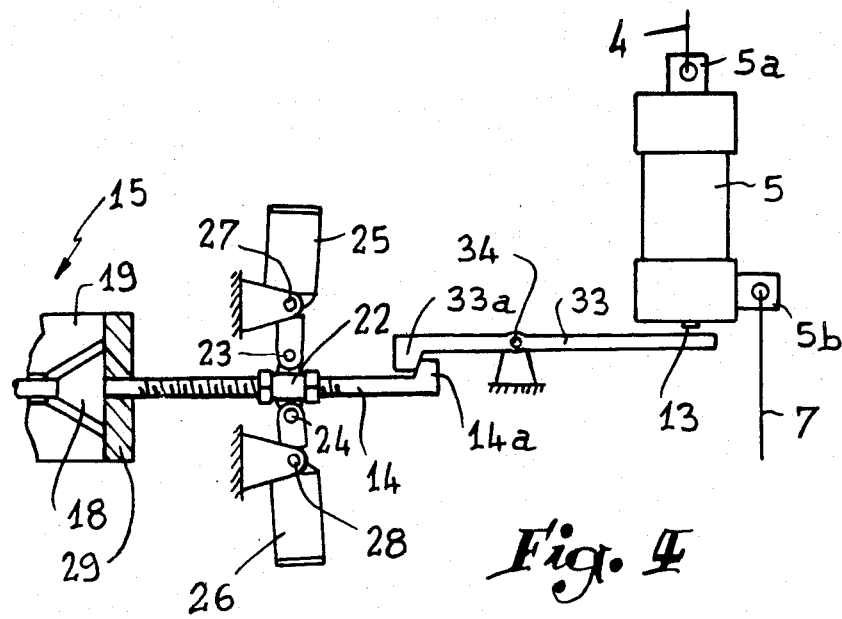
Figure 5:
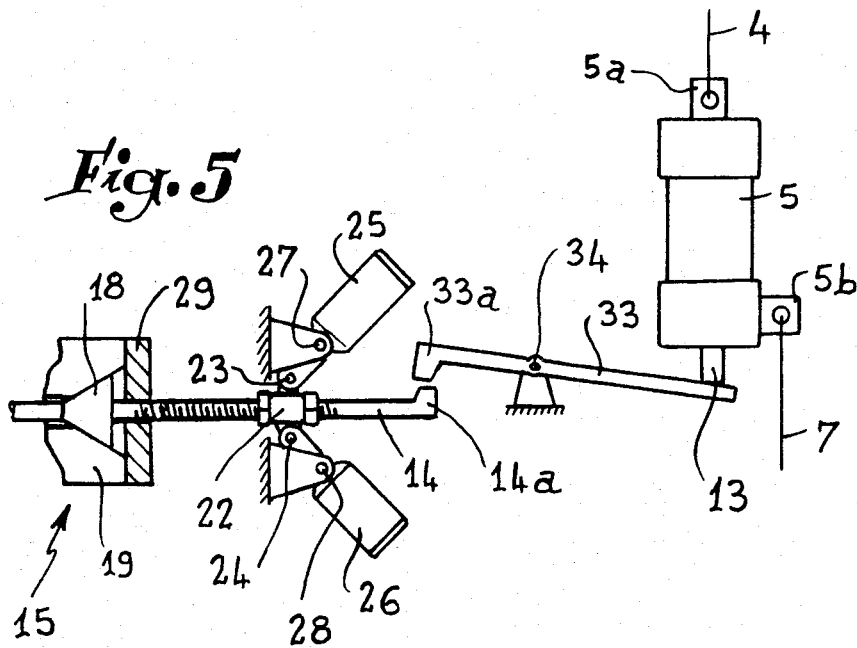

FIGS. 4 and 5 are partial views showing a variant embodiment of the short-circuiter, respectively in normal open position and in closed position after functioning of the fuse cartridge.

Referring now to the drawings, FIG. 1 schematically shows at 1 the metal stucture with which the safety system is to be associated. It may be assumed for example that it is a pole supporting the contact conductor of an electric railway line. A conductor 2 connects this structure to the input 3a of a potential difference detector 3 (voltmetric detector) of which the output 3b is connected by a conductor 4 to one of the heads of a fuse cartridge 5, the other head 5b being connected to ground or earth 6 by a conductor 7. In the above-mentioned case of an electric railway line, this ground 6 advantageously comprises the rails of the line; in other cases, it may be a carefully established ground connection.

Inside the detector 3, the input 3a and the output 3b are connected by a circuit 8 in which is interposed a thyristor 9. Another circuit 10 also leaves from input 3a containing a diode 11 and a diac 12 adapted to perform the role of conduction theshold element; this second circuit 10 terminates at the gate of the thyristor 9.

The cartridge 5 comprises what is called a plunger, i.e. a knob or lug 13, normally retracted inside the cartridge, but which projects therefrom when it has functioned. In the example shown, it has been assumed that this plunger is axial, but it may be arranged differently and in particular may be mounted laterally on the body of the cartridge. In any case, the latter is disposed so that its plunger 13 may act on the rod 14 of a normally open switch or short-circuiter 15, which large-section conductors 16 and 17 connect on the one hand to the structure 1 and on the other hand to the ground 6. In the embodiment of FIG. 1, this short-circuiter comprises a cone 18, mounted on the rod 14 and adapted to short-circuit two fixed contacts 19,20 (FIG. 2) at which the said conductors 16,17 terminate. As shown, these fixed contacts each represent one half of a housing adapted to receive the cone 18, ensuring a large bearing surface thereof. The rod 14 extends beyond the contacts 19,20; it passes through an insulating block 21 adapted to form a support for said contacts, then it bears a short crosspiece 22 whose ends are articulated at 23 and 24 on two devices 25,26 with compression spring, themselves articulated at 27 and 28 on the fixed part of the apparatus. It will be understood that each device 25,26 comprises a rod on which is mounted a sort of piston adapted to move in a cylinder containing the spring. It will further be appreciated that the two devices constitute with the crosspiece 22 a toggle mechanism for passage from the neutral point of unstable equilibrium. The parts re adjusted so that, in the rest position of FIG. 1, the cone 18 being disengaged from contacts 19,20 the mechanism in question is just in front of said position of unstable equilibrium, this cone 18 therefore tending to move towards the right and thus abutting against a stop crosspiece 29 which simultaneously constitutes guide for rod 14.

The detector 3 further contains a surge arrester 30 interposed in a circuit 31 which, leaving input 3a terminates at a second output 3c which a conductor 32 connected to ground 6. This surge arrester is designed to start if there is a potential difference which comprises is greater than the conduction threshold of the diac 12, but which is fairly moderate and does not present any risk of instantaneous electrocution. For example, if the said threshold is 30 volts, the starting voltage of the surge arrester 30 may be of the order of 80 to 90 volts. In practice, this surge arrester may be made in the form of a bulb containing an appropriate gas under a determined pressure.

Operation is as follows:

Under normal conditions, the potential or voltage differences which may occur between the structure 1 and the ground 6 are very small and do not reach the conduction threshold of the diac 12. Furthermore, it will be noted that, if these voltages are alternating induction waves, the diode 11 blocks them in one direction, allowing them to pass only in the direction corresponding to the structure being accidentally made live. This corresponds in particular to the case of a railway line electrified with direct current.

In any case, the gate of the thyristor 9 receives no signal, the thyristor itself is therefore blocked and the cartridge 5 has no current passing therethrough.

As soon as the difference in potential between the structure 1 and the ground or earth 6 exceeds the threshold of the diac 12, there is conduction, the gate of the thyristor 9 triggers and the latter is conducting. If the structure is actually made live, and it is not a transient induced wave, the current which passes through the cartridge 5 is sufficient to cause it to blow so that the plunger 13 advances towards the left and strikes the rod 14 which it moves to a very small, but sufficient extent to pass the neutral point of the unstable equilibrium or toggle mechanism 25,26. The rod 14 is then strongly urged towards the left and the core 18 engages by force between the two contacts 18,19. The short-circuiter therefore passes to the closed position of FIG. 3, so that the structure is connected to ground through the large-section conductors, this eliminating any risk of electrocution upon contact and short-circuiting all the possible leakage currents by grounding. Of course, this positive grounding of the structure may possibly bring about an overcurrent on the line in question and may trigger off a circuit breaker. In any case, connection to ground is ensured until the cartridge 5 has been changed and the short-circuiter switch 15 has been returned to open position (assuming, of course, that the fault which caused the structure 1 to become live has been eliminated).

Between the moment when the potential of the structure 1 with respect to the ground reaches the conduction threshold of the detector 3 and the moment when the short-circuiter 15 is closed, a very short, but nonetheless appreciable time (a few milliseconds for example), necessarily lapses. If the potential applied to the structure is high (for example 1500 volts in the case of an electric railway line), this may be sufficient to electrocute a person in contact with the structure. This danger is avoided by the surge arrester 30 which, during this very short instant, ensures a discharge path preventing the potential of the structure from rising above its starting voltage. Even if this voltage is of the order of a hundred volts, it is not sufficient to provoke a phenomenon of electrocution in such a short time.

It may of course be envisaged to associate with the apparatus an optical, acoustic or other signalling circuit, which immediately alerts the maintenance staff so that they can put right the fault which made the structure live.

Figure 2:
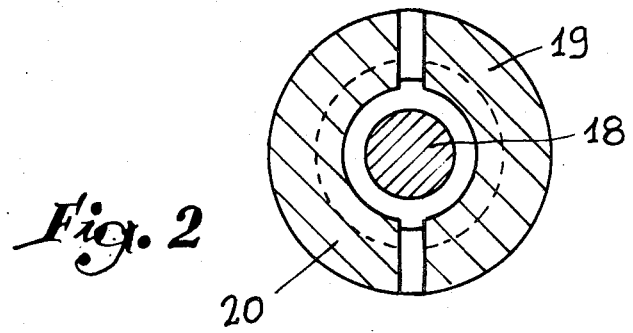
FIG. 2 is a section of a detail, along II—II (FIG. 1).

In the embodiment of FIGS. 1 to 3, the plunger 13 must exert on the rod 14 of the short-circuiter 15 a sufficient thrust to move it some way against the forces of friction, which are relatively high, since the reaction of the springs is then at its maximum. Ball, needle or blade articulations may naturally be provided to reduce these efforts, but this complicates construction. FIGS. 4 and 5 indicate a variant which avoids this drawback. In this case, the rod 14 is still provided for supporting the cone 18 adapted to cooperate with the fixed contacts such as 19. Also present is the articulated toggle mechanism with the two spring devices 25,26 which are here disposed between the cone 18 and the fuse cartridge 5, rather than on the other side of the short-circuit 15, which constitutes only a constructive difference of no importance. However, the parts are adjusted so that, in rest position (short-circuiter open), the mechanism 25-26 has already passed beyond its position of unstable equilibrium in the direction of displacement towards the left (direction of closure of the short-circuiter).

The short circuiter 15 therefore tends to close under the effect of the springs but its rod 14 comprises at its end a tooth 14a which is normally retained by the hooked end 33a of a lever 33 articulated at 34 on the frame of the apparatus. The cartridge 5 is disposed so that its plunger 13 acts on this lever to disengage the end 33a from the tooth 14a.

Under these conditions, at rest, the short-circuiter 15 is maintained in open position by the lever 33 (FIG. 4), but immediately the plunger 13 leaves the cartridge, this lever pivots, disengaging the tooth 14a, which enables the short-circuiter 15 to close under the effect of the spring devices 25,26 (FIG. 5). Due to the presence of the retaining tooth 14a and to the mechanical advantage effort which the lever 33 may effect, the force necessary for triggering may be much reduced, this increasing the reliability of the apparatus and dispensing with the necessity of associating a particularly strong spring with the plunger.

In practice, it may be advantageous to combine the detector 3 with the cartridge 5 so as to form a single, interchangeable assembly, experience showing that, when the system has functioned, not only the cartridge must be replaced, but also the detector which may have suffered from the momentary overcurrent to which it was subjected. However, this combination may further present a particular technical advantage if care is taken to dispose the surge arrester 30 in the immediate vicinity of the cartridge or a fuse, or better, near the weak point of this fuse. In fact, it is known that a fusible band is frequently used in the cartridges, on which is made a point of smaller section, by a perforation, constriction or the like, so as to localise the beginning of fusion. If the surge arrester is located in the immediate vicinity of this point, it receives the ionized gases as soon as the cartridge begins to function and it may then be started under a much reduced voltage. It is thus possible to make it simply in the form of two very close electrodes, without bulb of gas under reduced pressure, whilst ensuring that the starting voltage will be low enough to avoid any danger of immediate electrocution.

Of course, to obtain the above technical result, it suffices to combine with the cartridge the surge arrester alone, the rest of the detector being able to remain apart.

In this respect, a small chamber may in particular be provided inside the cartridge, inside which are located both the weakened point or zone of the fuse and the surge arrester, this chamber being defined by walls separating it from the filling mass of arc extinction matter generally provided in the cartridges.

What is claimed is:

1. A system for grounding a metal structure if it should become electrically live to prevent risk of electrocution, comprising in combination:
   (a) voltage detector means having an output and having an input connected to the structure and including semiconductor means having a low conduction threshold voltage;

(b) fuse cartridge means having a plunger rendered operative when the cartridge means is blown, said fuse cartridge means being connected to said output so that it is mounted in series with said semiconductor means between said structure and ground;
(c) a short-circuiting switch connected directly between said structure and ground, said switch being normally open;
(d) means actuated by said plunger to close said switch when said fuse cartridge means is blown; and
(e) spark gap means connected directly between said structure and ground, said spark gap means having a striking voltage not exceeding 100 volts.

2. In a system as claimed in claim 1, said fuse cartridge means having a fuse element which ionises when the cartridge means is blown, and said spark gap means being combined with said fuse cartridge means so that the spark gap is directly adjacent to the fuse element, whereby ionization of the element helps strike the spark gap means.

3. In a system as claimed in claim 1, said semiconductor means of the voltage detector means comprising a semiconductor element and a thyristor rendered conductive by said semiconductor element when the latter conducts current.

4. In a system as claimed in claim 1, said voltage detector means including a diode in series with said semiconductor means to make the detector means responsive to the flow of current of only one polarity with respect to ground, whereby to eliminate response to alternating currents induced in the structure.

* * * * *